Dec. 6, 1949   R. C. KENNEDY   2,490,733
HIGH-VOLTAGE POWER SUPPLY
Filed April 9, 1948
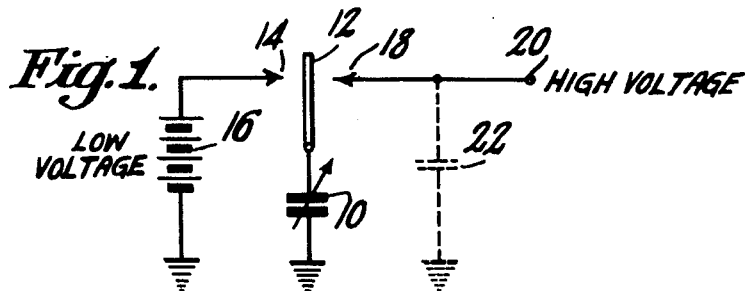
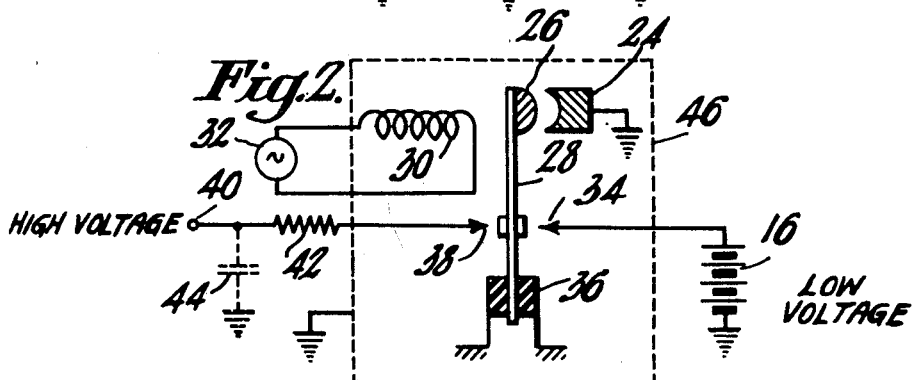
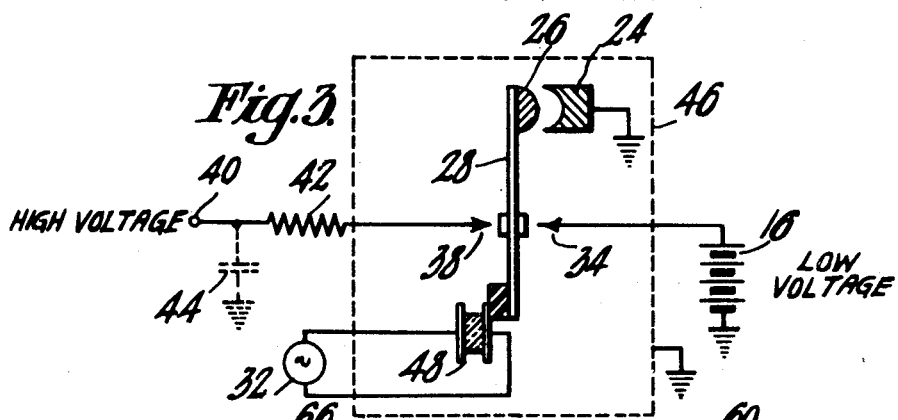
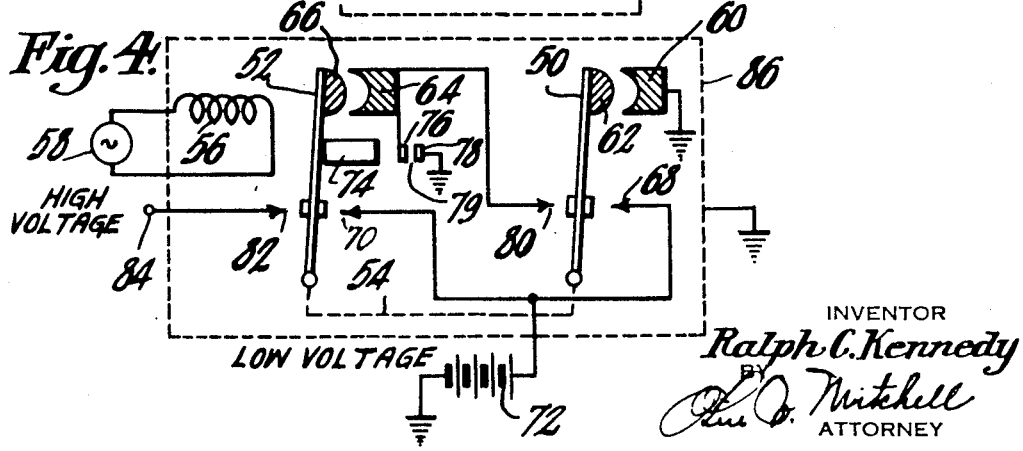
INVENTOR
Ralph C. Kennedy
BY
Mitchell
ATTORNEY Patented Dec. 6, 1949

2,490,733

UNITED STATES PATENT OFFICE 2,490,733

HIGH-VOLTAGE POWER SUPPLY

Ralph C. Kennedy, Arlington, N. J., assignor to Radio Corporation of America, a corporation of Delaware Application April 9, 1948, Serial No. 19,945

11 Claims. (Cl. 171—97)

This invention relates to the method and apparatus for the production of high voltages, and more particularly to the production of high direct current potentials suitable for application to cathode ray type tubes such as are used in television transmission and reception, oscilloscopes, electron microscopes, etc.

The apparatus necessary for the production of high electric potentials suitable for electron beam acceleration in cathode ray tubes at the present time is quite bulky and expensive. Particularly in television receivers, there is a need for an economical power supply capable of producing potentials in the order of several thousand volts or more.

Probably the earliest approach to this problem was based upon the use of well known 60 cycle step-up transformers for producing the requisite peak voltage in 60 cycle sinusoidal form which was subsequently rectified and filtered in order to supply the required D. C. potential. The expense and size of the transformers and more particularly the expense and size of the requisite filter components for such a supply are indeed excessive for the voltage magnitude and current requirements for operation of the larger kinescopes. As the television art progressed, use was made of the Tesla coil action in conjunction with a medium frequency RF oscillator driver which combination produced high peak voltages which again were rectified and filtered for producing the necessary high D. C. potential source. The higher rectified pulse frequency obtainable by this method made the size and cost of the necessary filter much lower and consequently offered marked advantages in these directions. The usually necessary shielding of the RF Tesla transformer for use in such a system, however, offers certain objections. Another type high voltage supply has been used in which, in a deflection generator, pulse rectification of "fly-back" transients has been accomplished by the addition of a high voltage winding to the core of the horizontal deflection output transformer. Although this method is economical for the generation of the required high voltage, and simplifies the required filtering circuit because of the 15,750 cycle pulse repetition rate, it does have the disadvantage of generally exhibiting relatively poor regulation with respect to load requirements.

The present invention provides means for supplying a high voltage D. C. potential from the ordinary low D. C. supply embodied in a television receiver (or like equipment) through the use of a simple variable capacitor driven by suitable external mechanism, and thereby providing a self contained system having unique design which requires no electronic rectifying action.

It is the purpose of this invention to construct means for converting low D. C. potential to a high D. C. potential through the periodic charging and storage capabilities of a suitable variable capacity condenser.

It is further an object of this invention to provide a system for producing high D. C. potentials through the proper application of a variable capacity condenser to a source of low D. C. potential.

It is further the object of this invention to provide a source of D. C. potential suitable for second anode operation of kinescopes and like apparatus, said potential source being electromechanically derived directly from the low voltage D. C. supply used for operation of companion equipment.

It is a further object of this invention to provide a method of generating high D. C. potential which is amenable to economical construction and offers novel features of operation in that it may be adjusted or operated to supply the needs of cathode ray tube only during the period when the beam is in its tracing phase.

In the disclosure of the methods and apparatus necessary to achieve the aforesaid purposes, reference will be made to the following drawings, in which:

Figure 1 is a schematic representation of the general form of my invention;

Figure 2 is a representation of an embodiment of the present invention;

Figure 3 is a representation of another embodiment of my invention;

Figure 4 is a diagram of the modification of the embodiment of my invention shown in Figure 2.

In the following description of the drawings, like parts will be designated by like reference numbers.

Referring now to the drawings for a more complete understanding of my invention, it is seen in Figure 1 that a variable capacitor 10 is adapted for charging through armature 12 and switch contact 14 from the low voltage source 16. After condenser 10 has received its full charge and the armature 12 is disconnected from the contact 14, the variable capacitor 10 may be reduced in capacity while retaining its charge. Assuming that the condenser is of reasonably high "Q" and that leakage paths across the terminals of the condenser have been minimized, the voltage across the terminals of the condenser will necessarily rise with the aforesaid decrease in capacity. This action follows the well known equation $Q=CV$, wherein $Q$ is a charge expressed in coulombs on a condenser, $C$ represents the capacity of the condenser and $V$ represents the voltage across the terminals of the condenser. It is readily apparent from the rearrangement of this equation $V=Q/C$, that in accord with the previous, the voltages ($V$) across the terminals of the condenser will necessarily rise provided the charge "$Q$" is held constant while the reduction in capacity ($C$) occurs. In the condition of increased terminal voltage, due to the low loss reduction of capacity, the condenser 10 may then be connected by means of armature 12 to switch contact 18 thereby supplying high voltage to the terminal 20. This cycle of charging, reducing capacity and connecting to the high voltage terminal 20 may be done at a very rapid rate through rapid action of the switch armature 12, and consequently can make available at the high voltage terminal 20 a capacity for current drain which is dependent in magnitude upon the rate of transfer of energy from supply source 16 to the high voltage supply terminal 20 by means of switch armature 12. Upon loading the high voltage supply terminal 20, the switch armature 12 supplies a pulse type of charging current which may be effectively filtered out by stray or lumped capacity which is optionally shown at 22.

The embodiment of my invention shown in Figure 2 is based upon the principles described in connection with Figure 1 and employs a low voltage power supply 16 which is adapted for charging a variable capacitor formed between the stationary grounded electrode 24 and moving electrode 26 attached to an armature or vibrating reed 28. The reed 28 is actuated or vibrated by means of coil 30 which may be excited by an alternating current source 32. The capacity existing between the plates 24 and 26 of the variable condenser will be maximum as plate 26 most nearly approaches plate 24, in which position vibrator reed 28 is disposed to conductively touch contact 34 which permits the existing maximum capacity to be charged from low voltage source 16. As the reed 28, which is suitably insulated from ground by insulation such as 36, moves to the left under action of the alternating magnetic flux created by coil 30, the distance between plates 24 and 26 of the condenser increases and thereby reduces the capacity of the variable condenser. Since the conductive vibrator reed 28 and the condenser element 26 attached thereto are insulated from ground, the charge on the variable condenser remains appreciably constant while the separation of the condenser plates is accomplished by the movement of the reed. In its minimum capacity condition, produced by the maximum separation of condenser elements 24 and 26, the reed 28 is disposed to touch switch contact 38 which then applies the increased voltage across the terminals 24 and 26 of the condenser to the high voltage output terminal 40. As before mentioned, the periodic switching of the reed armature 28 will cause D. C. pulses to appear across the high voltage terminals when appreciable high voltage load is imposed upon the converter. Hence, it may be desirable to place filtering resistor 42 in series with the high voltage circuit which in cooperation with the stray circuit capacity shown at 44 will serve to filter out such D. C. pulses. It may be also desirable to enclose the vibrating reed and its associated variable condenser as well as the contacts thereon in a grounded evacuated metallic chamber such as indicated by dotted line 46. Such an arrangement will tend to reduce the arcing at contacts 34 and 38 and further reduce the degree of noise radiation from the unit. Further, the variable condenser existing between elements 24 and 26 will be subject to less leakage in the rarified atmosphere of the chamber than if exposed to the outer atmosphere.

The embodiment of the invention shown in Figure 3 is practically identical to that shown in Figure 2. The only point of difference in this arrangement lies in the use of a Tourmaline or other piezo-electric crystal 48 which is adapted to drive reed 28 from the driving source 32. In other respects, the operation of the converter is the same as that as described with reference to Figure 2.

It may be desirable to obtain a higher voltage for a given change in capacity in such a unit, and the present system lends itself readily to a form of voltage doubler device of a type similar to that shown in Figure 4. In this embodiment two vibrating reeds 50 and 52 are mechanically linked as indicated by dotted line 54, and are driven from the flux created by coil 56 which receives its excitation from alternating current source 58. The reeds 50 and 52 are respectively associated with condenser elements 60 and 62, and 64 and 66, which may be of a form similar to that indicated in the embodiments shown in Figures 2 and 3. In the operation of this voltage doubler, the variable capacitors existing between the plates 60 and 62, and 64 and 66, are charged through contacts 68 and 70 respectively from the low voltage source 72. As heretofore described, this charging occurs at the maximum capacity position of the two variable condensers. It is noted that element 64 of the variable condenser associated with reed 52 is not always at ground potential as is element 60 of the condenser associated with reed 50. However, at the time that charging is accomplished from the low voltage source 72, extension 74 of reed 52, actuates and closes contacts 76 and 78 of the grounding switch 79 and places the element 64 at ground potential while being charged. As the vibrating reeds 50 and 52 reach their minimum capacity position, the two variable condensers, now having maximum terminal voltage in accordance with the principles previously described, will then be placed in series adding through contacts 80 and 82 so as to apply the sum of the individual condenser voltages between the terminal 84 and ground. Once again a suitable capacitive filter (not shown) may be desirable in the output circuit to reduce switching ripple caused by the vibrating reed contacts. The condensers and the contacts may be enclosed in a shielded evacuated container 86 which serves to improve the efficiency of the unit as well as reduce its radiation of noise disturbances as described above.

In the operation of my above-described invention, the effective boost in voltage is of a magnitude directly proportional to the percentage decrease in the capacitance of the variable condenser from the instant the condenser is fully charged from the low voltage source, to the instant it is connected to the high voltage output terminal in its minimum capacity condition. Accordingly, it is desirable to realize the maximum possible capacity between the plates of the variable condenser at the instant the two plates have their minimum separation and to achieve this, I have indicated cooperative concave and convex spherical surfaces on the respective plates of the condensers such as 24 and 26 in Figures 2 and 3 and in this way afford increased area common to the two surfaces in the maximum capacity position. Other surface configurations may be satisfactorily employed toward this end, the spherical construction shown being only indicative of a consideration worthy of attention in the economical construction of an embodiment of this invention.

It is pertinent to note that a number of individual converter unit voltage outputs of the type illustrated in Figure 2 and Figure 3 above, may be readily put into series by the synchronization of their reed switches through connection of the reed driving means to a common driving source of voltage. On the other hand if the reed driving voltage for a properly adjusted converter of the type shown is derived from the synchronized horizontal deflection signal in a television receiver, unique operation is possible wherein the high voltage is produced only during the trace phase of the electron beam in the kinescope. Such an arrangement would need but a small value of storage capacity across the output terminal of the converter to act as sufficient filtering for this system. This requisite small value of filter capacitance may be realized in some cases as the sum of total stray wiring capacitance and inner to outer coating capacitance of the kinescope.

Although the present invention finds ready application to present day high voltage television requirements, it is to be appreciated that a converter of this type is useful as a source of high potential for the operation of electrostatic preciptators, smoke eliminators, paint applicators, and the like. Many other modifications and applications of my invention will occur to those skilled in the art after benefiting from the teaching of this invention without, however, departing from the spirit and scope of the following claims.

What is claimed is:

1. In a system for deriving a high D. C. potential from a low D. C. potential source, a variable capacitance, a source of D. C. potential, means operative to alter the value of capacitance, output terminals, vibratory switching means for cyclingly and alternatingly placing said capacitance in momentary charging relationship to said low D. C. potential source, said switching means also being adapted to momentarily connect said capacitance to said output terminals subsequent to the establishment and discontinuance of said momentary charging relationship, said switching means being further operatively coupled with said capacitance magnitude altering means to synchronously increase capacitance during momentary charging thereof over that value of capacitance afforded during the momentary connection thereof to said output terminals.

2. In a system for deriving a high D. C. potential from a low D. C. potential, a variable capacitance, a source of low D. C. potential, an output circuit, means operative to alter the magnitude of said capacitance, a vibratory switching means for cyclingly, alternatingly and separately connecting said capacitance firstly in charging relationship to said low D. C. potential source and secondly in energy supplying relationship with said output circuit, and means mechanically linked to said last named means for synchronous operation in accordance therewith for actuating said capacitance altering means to provide greater capacitance during charging thereof than during supply of energy therefrom.

3. In a system for deriving a high D. C. potential from a low D. C. potential, a source of D. C. potential, a variable capacitance, an output circuit, a vibratory mechanical switching mechanism for alternatingly and separately connecting said variable capacitance either to said low D. C. potential or said output circuit, means mechanically coupled to said switching mechanism for altering the magnitude of said capacitance, electromagnetic means for actuating said last named means concomitantly with said switching mechanism, and a signal source for energizing said electromagnetic means the phasing between said switching mechanism and said capacitance altering means being such that said capacitance is alternately connected to said source of low D. C. potential in a high capacity state and connected to said output circuit in a low capacity state.

4. In a system for deriving a high D. C. potential from a low D. C. potential, a source of D. C. potential, a variable capacitance, an output circuit, a vibratory mechanical switching mechanism for alternatingly and separately connecting said variable capacitance either to said low D. C. potential or said output circuit, means mechanically coupled to said switching mechanism for altering the magnitude of said capacitance, piezoelectric means for actuating said last named means concomitantly with said switching mechanism, and a signal source for actuating said piezo-electric means the phasing between said switching mechanism and said capacitance altering means being such that said capacitance is connected to said source of low D. C. potential in a high capacity state and connected to said output circuit in a low capacity state.

5. A container for a device of the type described in claim 3 wherein said variable capacitance and said switching means are operated in a rarified atmosphere to reduce losses of said variable capacitance and deterioration of electrical contacts associated with said switching means and means further for electromagnetically and electrostatically shielding said elements to prevent radiation of noise energy.

6. A unidirectional potential transducing mechanism comprising in combination, a flexible movable member having a set of electrical contacts fastened thereto, restraining means for confining the movement of said flexible member to substantially a single plane, a plurality of fixed electrical contacts adjacent said flexible movable member positioned for cooperation with the set of electrical contacts on said member, a fixed electrically conductive element adjacent said flexible member adapted to establish an electrical capacitance with respect to a conductive portion of said movable member, the value of capacitance being rendered a function of the position of said flexible member in its plane of motion, a conductive portion of said member being electrically connected to said member electrical contact, means for cyclically driving said movable member such to produce cyclic contact of the member electrical contacts with the fixed electrical contacts, means for applying a unidirectional charging potential between at least one of said fixed electrical contacts and said fixed conductive element for charging said electrical capacitance at a position of the movable member corresponding to a high electrical capacitor, and means for discharging said electrical capacitance through at least one other of said fixed electrical contacts at a position of the movable member corresponding to low electrical capacitance.

7. Apparatus according to claim 6 wherein the structure of said movable member includes magnetic material and wherein said means for cyclically driving said movable member comprises an electromagnet energized from a source of alternating current and placed adjacent said movable member for electromagnetic action on the magnetic material thereof.

8. Apparatus according to claim 6 wherein said means for cyclically driving said movable member comprises a piezo-electric driving unit mechanically coupled to said flexible member and adapted for excitation from a source of alternating voltage.

9. A unidirectional potential transducing mechanism comprising in combination: a first and second flexible movable member each having a separate set of electrical contacts fastened thereto, restraining means for confining the respective movements of said flexible member to substantially a single plane, a first and second assembly of fixed electrical contacts respectively adjacent the first and second flexible members, each of the fixed contact assemblies being positioned for cooperation with a respective set of flexible member contacts, a first and second fixed electrically conductive elements respectively adjacent the first and second flexible members, the fixed elements being adapted to form a first and second electrical capacitance with respective conductive portions of said first and second flexible members, the value of the so-formed capacitances being a function of the positions of the flexible members in their respective planes of movement, means for cyclically driving said movable members to produce cyclic contact of the member electrical contacts with their respective fixed electrical contacts, means for applying a unidirectional charging potential between at least one fixed electrical contact associated with each member and its respective fixed conductive element for charging the respective electrical capacitances during the respective positions of the movable members corresponding to high electrical capacitance, and means for discharging the electrical capacitances in series with one another through other electrical contacts respectively associated with each flexible member at a position of the movable members corresponding to low electrical capacitance.

10. Apparatus according to claim 9 wherein the structure of each of said movable members includes magnetic material and wherein said means for cyclically driving said movable members comprises an electromagnet energized from a source of alternating current and placed adjacent said movable member for electromagnetic action on the magnetic material thereof.

11. Apparatus according to claim 9 wherein said means for cyclically driving said movable members comprises a piezo-electric driving unit mechanically coupled to said driving members and adapted for excitation from a source of alternating voltage.

RALPH C. KENNEDY.

REFERENCES CITED

The following references are of record in the file of this patent:

UNITED STATES PATENTS

| Number | Name | Date |
| --- | --- | --- |
| 2,413,391 | Usselman | Dec. 31, 1946 |
| 2,417,452 | Stiefel | Mar. 18, 1947 |
| 2,418,128 | Labin | Apr. 1, 1947 |